(12) United States Patent
Lee et al.

(10) Patent No.: US 10,999,035 B2
(45) Date of Patent: May 4, 2021

(54) METHOD FOR MITIGATION OF MULTIPLE ACCESS INTERFERENCE IN MOBILE COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventors: Heesoo Lee, Daejeon (KR); Eun Kyung Kim, Daejeon (KR); Tae Joong Kim, Daejeon (KR); Hyun Seo Park, Daejeon (KR); An Seok Lee, Daejeon (KR); Yu Ro Lee, Daejeon (KR); Hyun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1 day.

(21) Appl. No.: 16/204,212

(22) Filed: Nov. 29, 2018

(65) Prior Publication Data

US 2019/0165916 A1    May 30, 2019

(30) Foreign Application Priority Data

Nov. 29, 2017 (KR) .................. 10-2017-0162150
Dec. 22, 2017 (KR) .................. 10-2017-0178679
Jun. 27, 2018 (KR) .................. 10-2018-0074355

(51) Int. Cl.
*H04L 5/00* (2006.01)
*H04B 7/0413* (2017.01)
(Continued)

(52) U.S. Cl.
CPC ......... *H04L 5/0053* (2013.01); *H04B 7/0413* (2013.01); *H04B 17/336* (2015.01);
(Continued)

(58) Field of Classification Search
CPC ... H04L 5/0053; H04L 5/0016; H04B 17/336; H04B 7/0413
See application file for complete search history.

(56) References Cited

U.S. PATENT DOCUMENTS 9,712,272 B2    7/2017  Zhu et al.
9,831,936 B2   11/2017  Kim et al.
(Continued)

FOREIGN PATENT DOCUMENTS

| KR | 10-2016-0146501 A | 12/2016 |
| KR | 10-2017-0049134 A | 5/2017 |
| WO | 2017/026700 A1 | 2/2017 |

OTHER PUBLICATIONS

LG Electronics, R1-162517, Considerations on DL/UL multiple access for NR, 3GPP TSG RAN WG1 #84bis, 3GPP (Apr. 2, 2016).
(Continued)

*Primary Examiner* — Jael M Ulysse
(74) *Attorney, Agent, or Firm* — LRK Patent Law Firm

(57) ABSTRACT

An operation method of a terminal in a non-orthogonal multiple access (NOMA) based communication system includes receiving information on a NOMA resource sequence allocated by a base station from the base station; and transmitting data to the base station by using a NOMA resource indicated by the information on the NOMA resource sequence in each data symbol or each data symbol group. Also, the NOMA resource sequence may indicate at least one NOMA resource in a NOMA resource set.

12 Claims, 9 Drawing Sheets

(51) Int. Cl.
*H04B 17/336* (2015.01)
*H04W 72/04* (2009.01)
(52) U.S. Cl.
CPC .......... *H04L 5/0016* (2013.01); *H04L 5/0094* (2013.01); *H04W 72/0453* (2013.01)

(56) References Cited

U.S. PATENT DOCUMENTS

| | | | | |
|---|---|---|---|---|
| 2005/0281317 A1* | 12/2005 | Oh | ................ | H04B 1/713 375/132 |
| 2012/0002740 A1* | 1/2012 | Han | ................ | H04L 5/0048 375/260 |
| 2015/0264670 A1* | 9/2015 | Lee | ................ | H04L 5/0007 370/312 |
| 2015/0312074 A1* | 10/2015 | Zhu | ................ | H04W 52/16 370/329 |
| 2015/0326360 A1* | 11/2015 | Malladi | ................ | H04L 27/3488 370/329 |
| 2015/0327095 A1* | 11/2015 | Kwak | ................ | H04B 7/0452 370/252 |
| 2016/0066345 A1* | 3/2016 | Sun | ................ | H04W 72/121 370/329 |
| 2016/0088594 A1* | 3/2016 | Xiong | ................ | H04L 5/0094 370/329 |
| 2016/0142193 A1* | 5/2016 | Benjebbour | ................ | H04J 11/0043 370/329 |
| 2016/0191175 A1* | 6/2016 | Hwang | ................ | H04L 1/1822 370/329 |
| 2016/0211867 A1* | 7/2016 | Guillemette | ................ | H03M 13/1114 |
| 2016/0269887 A1* | 9/2016 | Kim | ................ | H04W 72/02 |
| 2017/0013610 A1* | 1/2017 | Lee | ................ | H04L 1/00 |
| 2017/0041178 A1* | 2/2017 | Perotti | ................ | H04L 1/0042 |
| 2017/0164337 A1 | 6/2017 | Ryoo et al. | | |
| 2017/0171865 A1* | 6/2017 | Hwang | ................ | H04B 1/713 |
| 2017/0230138 A1* | 8/2017 | Xiong | ................ | H04W 72/0473 |
| 2017/0244525 A1* | 8/2017 | Zhu | ................ | H04W 72/04 |
| 2017/0279561 A1* | 9/2017 | Nakamura | ................ | H04L 27/0008 |
| 2017/0289920 A1* | 10/2017 | Liu | ................ | H04W 52/10 |
| 2017/0289971 A1* | 10/2017 | Wu | ................ | H04L 1/1671 |
| 2017/0290046 A1* | 10/2017 | Sun | ................ | H04L 25/0202 |
| 2017/0302417 A1* | 10/2017 | Chun | ................ | H04L 27/26 |
| 2017/0331573 A1* | 11/2017 | Li | ................ | H04W 72/1289 |
| 2017/0367120 A1* | 12/2017 | Murray | ................ | H04B 7/0695 |
| 2018/0048348 A1* | 2/2018 | Gau | ................ | H04W 72/0453 |
| 2018/0054218 A1* | 2/2018 | Qian | ................ | H03M 13/271 |
| 2018/0054800 A1* | 2/2018 | Yeo | ................ | H04W 68/02 |
| 2018/0146493 A1* | 5/2018 | Yoon | ................ | H04W 72/02 |
| 2018/0323920 A1* | 11/2018 | Zhu | ................ | H04L 5/0016 |

OTHER PUBLICATIONS

ZTE, R1-162226, Discussion on multiple access for new radio interface, 3GPP TSG RAN WG1 #84bis, 3GPP (Apr. 1, 2016).

CATT, R1-163383, Candidate Solution for New Multiple Access, 3GPP TSG RAN WG1 #84bis, 3GPP (Apr. 6. 2016).

Fujitsu, R1-142929, "RPT design for D2D communication", 3GPP TSG RAN WG1 #78, 3GPP (Aug. 10, 2014).

Preliminary examination result notification dated Jul. 16, 2019 from the KIPO in connection with the corresponding Korean patent application No. 10-2018-0150418 of the above identified application.

\* cited by examiner

FIG. 3
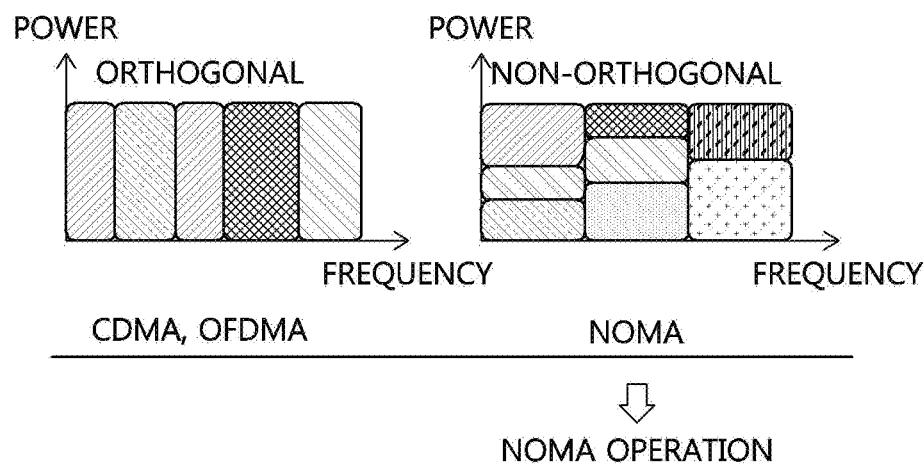
CDMA, OFDMA | NOMA
NOMA OPERATION
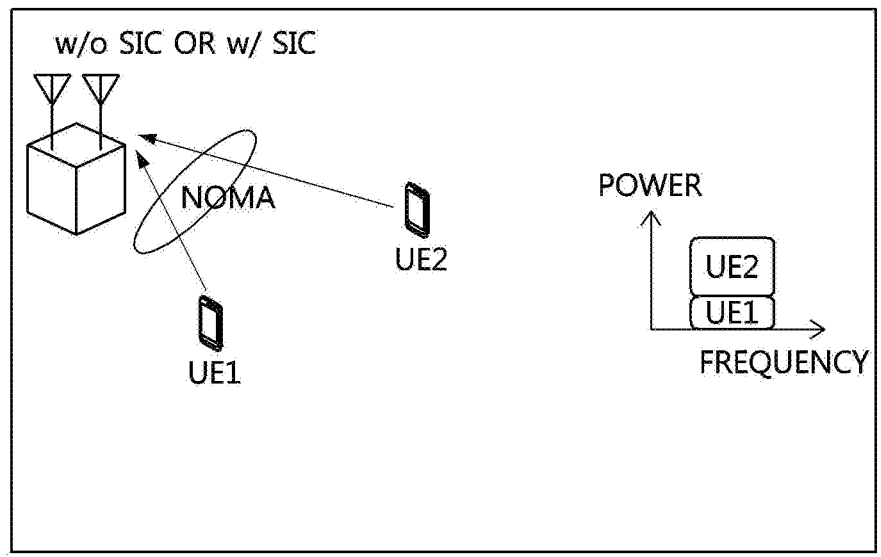

METHOD FOR MITIGATION OF MULTIPLE ACCESS INTERFERENCE IN MOBILE COMMUNICATION SYSTEM AND APPARATUS FOR THE SAME

CROSS-REFERENCE TO RELATED APPLICATIONS

This application claims priority to Korean Patent Application Nos. 10-2017-0162150, filed Nov. 29, 2017, 10-2017-0178679, filed Dec. 22, 2017, and 10-2018-0074355, filed Jun. 27, 2018, in the Korean Intellectual Property Office (KIPO), the entire contents of which are hereby incorporated by reference.

BACKGROUND

1. Field of the Invention

The present disclosure relates to a method and an apparatus for mitigating multiple access interferences in a mobile communication system, and more particularly, to a method and an apparatus for mitigating variation of multiple access interferences by controlling multiple access resources in a non-orthogonal multiple access (NOMA) based mobile communication system.

2. Description of Related Art

A fifth generation (5) mobile communication aiming at giga bps (Gbps) class support of at least 10 to 100 times data transmission rate than a fourth generation (4G) mobile communication may use not only existing mobile communication frequency bands but also several tens giga Hertz (GHz) frequency band. The 5G mobile communication may support a massive machine type communication (mMTC) and an ultra-reliable low latency communication (URLLC) for support of Internet of things as well as support of enhanced mobile broadband (eMBB).

Meanwhile, a non-orthogonal multiple access (NOMA) has been studied as a candidate technology for achieving an increase in cell capacity in the fifth generation mobile communication. The NOMA is a technology that breaks the orthogonality in the frequency resource allocation of an orthogonal frequency division multiple access (OFDMA) scheme and improves the frequency efficiency by simultaneously transmitting data for two or more terminals on the same time, frequency, and space resources. However, the NOMA has a problem of causing multiple access interference (MAI) due to such the resource allocation and deteriorating system performance.

SUMMARY

In order to solve the above-described problem, embodiments of the present disclosure provide an operation method of a base station for mitigating multiple access interferences in a NOMA-based mobile communication system.

In order to solve the above-described problem, embodiments of the present disclosure also provide an operation method of a terminal for mitigating multiple access interferences in a NOMA-based mobile communication system.

In order to solve the above-described problem, embodiments of the present disclosure also provide a terminal for mitigating multiple access interferences in a NOMA-based mobile communication system.

In order to achieve the objective of the present disclosure, an operation method of a terminal in a non-orthogonal multiple access (NOMA) based communication system may comprise receiving information on a NOMA resource sequence allocated by a base station from the base station; and transmitting data to the base station by using a NOMA resource indicated by the information on the NOMA resource sequence in each data symbol or each data symbol group, wherein the NOMA resource sequence indicates at least one NOMA resource in a NOMA resource set.

The NOMA resource may be a spreading code allocated by the base station.

The degree of cross-correlation between the spreading codes may vary every time slot.

The NOMA resource may be a subcarrier mapping pattern in a radio resource block (RB), which is used for data communications with the base station.

The operation method may further comprise, when the number of data symbols or data symbol groups transmitted by a terminal x and a terminal y using a NOMA resource a and a NOMA resource b is $W_{xy}^{ab}$, allocating the NOMA resources so as to satisfy $W_{ij}^{pq} = W_{mn}^{rs}$ (for all $i \neq j$, $m \neq n$, $p \neq q$, $r \neq s$).

The NOMA resource sequence may use a mutually-orthogonal Latin square matrix.

The t-th value $Z_i^t$ of the i-th NOMA resource sequence is defined as $Z_i^t = L_{v+1}^{i(w+1)}$ for an element $L_k^{pq}$ at a p-th row and a q-th column of a matrix $L_k$ which is a N×N mutually-orthogonal Latin square matrix, and $t = (N-1) \times N \times u + N \times v + w$ (u and v are non-negative integers, and w is one of $\{0, 1, 2, \ldots, N-1\}$).

In order to achieve the objective of the present disclosure, an operation method of a base station in a non-orthogonal multiple access (NOMA) based communication system may comprise transmitting information of a NOMA resource sequence allocated to a first terminal to at least one terminal; and receiving data from the first terminal by using a NOMA resource indicated by the information on the NOMA resource sequence in each data symbol or each data symbol group, wherein the NOMA resource sequence indicates at least one NOMA resource in a NOMA resource set.

The NOMA resource may be a spreading code allocated to the first terminal.

The degree of cross-correlation between the spreading codes may vary every time slot.

The NOMA resource may be a subcarrier mapping pattern in a radio resource block (RB), which is used for data communications with the first terminal.

When the number of data symbols or data symbol groups transmitted by a terminal x and a terminal y using a NOMA resource a and a NOMA resource b is $W_{xy}^{ab}$, the NOMA resources may be allocated so as to satisfy $W_{ij}^{pq} = W_{mn}^{rs}$ (for all $i \neq j$, $m \neq n$, $p \neq q$, $r \neq s$).

The NOMA resource sequence may use a mutually-orthogonal Latin square matrix.

The t-th value $Z_i^t$ of the i-th NOMA resource sequence may be defined as $Z_i^t = L_{v+1}^{i(w+1)}$ for an element $L_k^{pq}$ at a p-th row and a q-th column of a matrix $L_k$ which is a N×N mutually-orthogonal Latin square matrix, and $t = (N-1) \times N \times u + N \times v + w$ (u and v are non-negative integers, and w is one of ($\{0, 1, 2, \ldots, N-1\}$).

The operation method may further comprise classifying the at least one terminal into different (S-1) groups each having S orthogonal resources; allocating orthogonal resources to terminals in each group among the classified groups; and allocating the NOMA resources among the classified groups.

The orthogonal resources of each group may be identical to or different from each other.

The t-th value $Z_{gi}^{t}$ of the i-th NOMA resource sequence in a g-th group among the classified groups may be defined as $Z_{gi}^{t}=L_{g}^{i(w+1)}$ for an element $L_{k}^{pq}$ at a p-th row and a q-th column of a matrix $L_k$ which is a N×N mutually-orthogonal Latin square matrix, and t=N×v+w (v is a non-negative integer, and w is one of {0, 1, 2, . . . , N−1}).

In order to achieve the objective of the present disclosure, a terminal in a non-orthogonal multiple access (NOMA) based communication system may comprise at least one processor, a memory storing at least one instruction executed by the at least one processor, and a transceiver controlled by the at least one processor. Also, the at least one instruction may be configured to receive, by using the transceiver, information on a NOMA resource sequence allocated by a base station from the base station; and transmit, by using the transceiver, data to the base station by using a NOMA resource indicated by the information on the NOMA resource sequence in each data symbol or each data symbol group, wherein the NOMA resource sequence indicates at least one NOMA resource in a NOMA resource set.

The NOMA resource may be a spreading code allocated by the base station.

The NOMA resource may be a subcarrier mapping pattern in a radio resource block (RB), which is used for data communications with the base station.

According to the embodiments of the present disclosure, it is made possible to mitigate the multiple access interference in the NOMA based communication system by using the resource allocation and the multiple access resource sequence which reduce the fluctuation of the multiple access interference in the NOMA scheme.

BRIEF DESCRIPTION OF DRAWINGS

Embodiments of the present disclosure will become more apparent by describing in detail embodiments of the present disclosure with reference to the accompanying drawings, in which:

FIG. 3 is a conceptual diagram illustrating a UL non-orthogonal multiple access scheme in the 5G mobile communication system;

DETAILED DESCRIPTION

Figure 1:
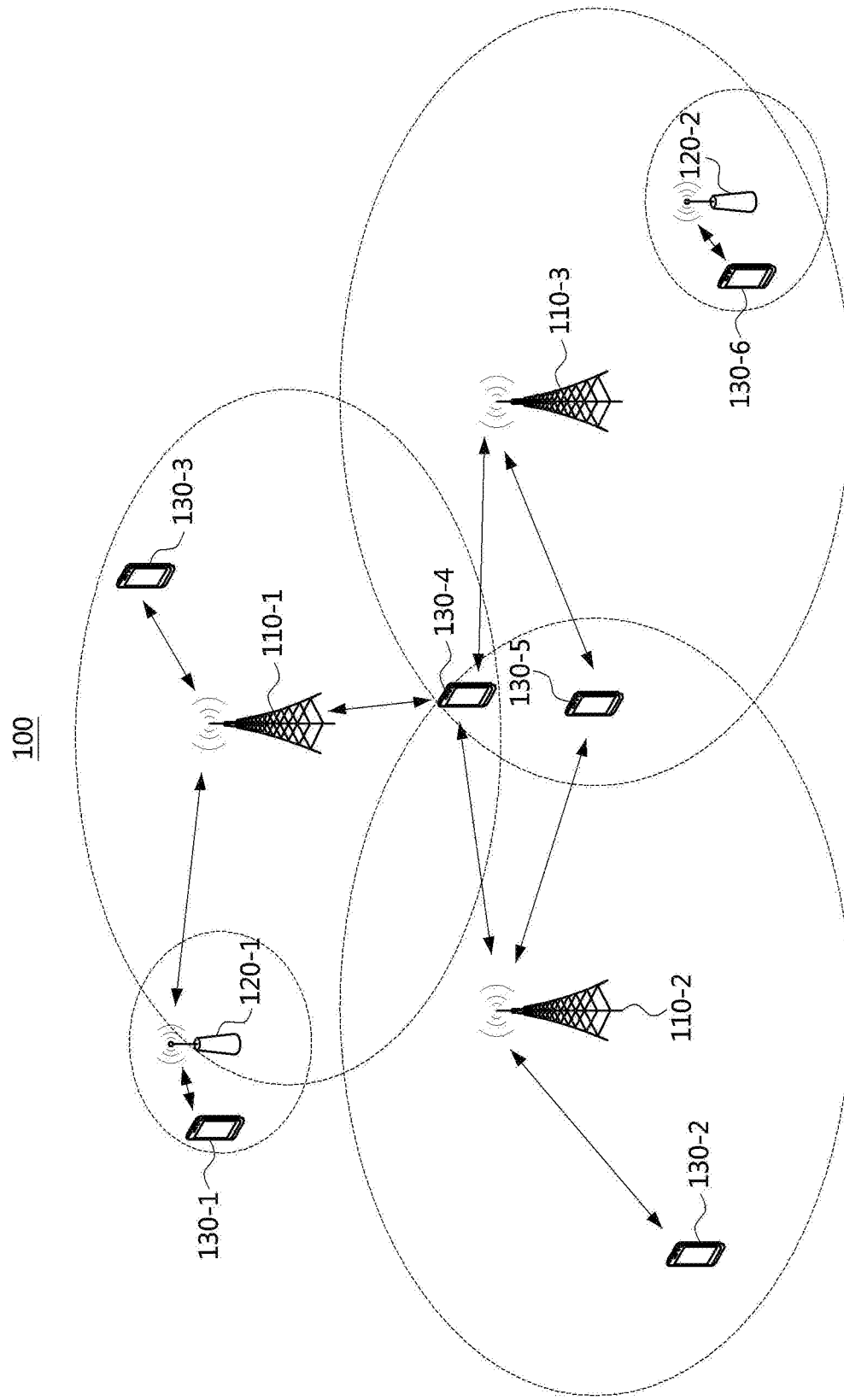
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may also be referred to as a 'communication network'. Each of the plurality of communication nodes may support at least one communication protocol. For example, each of the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol. Also, each of the plurality of communication nodes may have the following structure.

Figure 2:
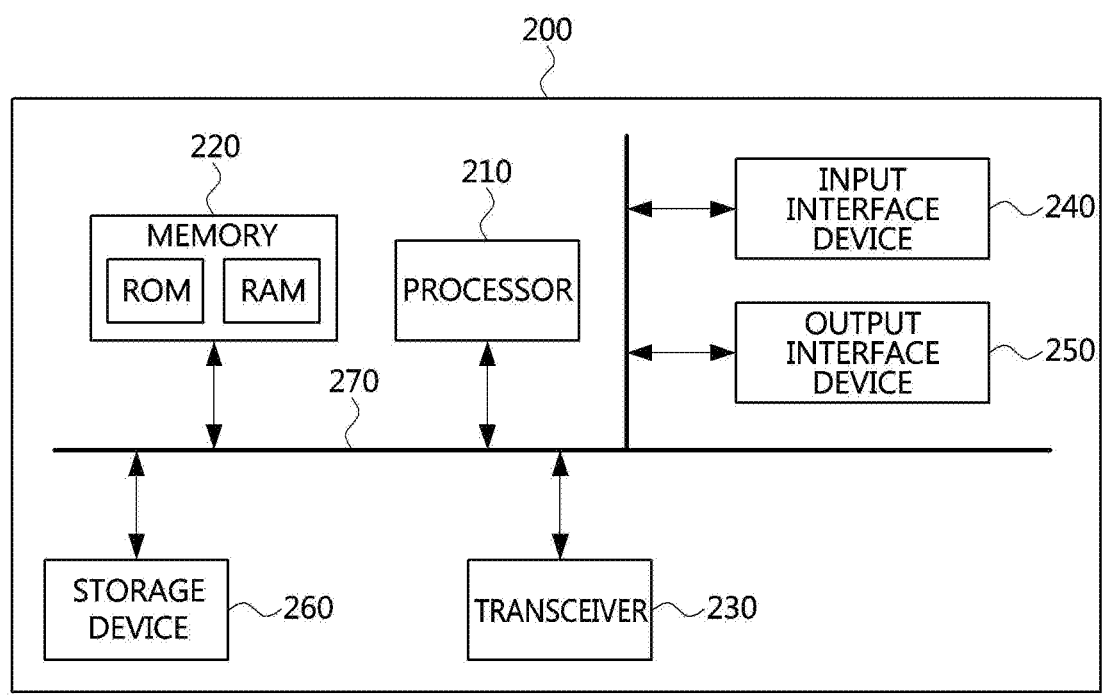
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-eNB, a base transceiver station (BTS), a radio base station, a radio transceiver, an access point, an access node, a road side unit (RSU), a radio remote head (RRH), a transmission point (TP), a transmission and reception point (TRP), a flexible TRP (f-TRP), gNB, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, a device supporting internet of things (IoT) functions, a mounted module/device/terminal, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Next, non-orthogonal multiple access (NOMA) techniques will be described. Here, even when a method (e.g., transmission or reception of a signal) to be performed in a first communication node among communication nodes is described, a corresponding second communication node may perform a method (e.g., reception or transmission of the signal) corresponding to the method performed in the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

In the 3GPP LTE and LTE-A, the conventional fourth generation mobile communication systems, the OFDMA scheme in which orthogonal resources between synchronized base station and terminals are configured and allocated to each terminal is used. Such the synchronization-based OFDMA scheme is advantageous in that a high signal-to-noise ratio (SNR) can be obtained because there is no inter-terminal interference and thus a relatively high data rate can be obtained.

However, the OFDMA scheme is not an optimal multiple access scheme, and the number of terminals that can be simultaneously supported is determined according to the number of orthogonal resources, and the radio resource overhead for maintaining the orthogonal resources and maintaining the synchronization is relatively large. Therefore, in order to improve frequency efficiency while maintaining a similar radio resource overhead, a multiple access scheme which is the closest to the optimal efficiency is being considered information-theoretically.

There is also a need to provide wireless accesses to multiple terminals with a relatively low overhead to accommodate the mMTC service, which requires ultra-connectivity. A number of non-orthogonal multiple access (NOMA) schemes are being considered for these various services.

FIG. 3 is a conceptual diagram illustrating a UL non-orthogonal multiple access scheme in the 5G mobile communication system.

Referring to FIG. 3, there is shown a NOMA scheme that provides multiple accesses by accommodating one or more terminals per resource on the synchronization based orthogonal resources to improve system connectivity and improve frequency efficiency.

In the UL NOMA scheme, sequential decoding and interference cancellation should be performed at the base station, but it can improve frequency efficiency and connectivity per radio resource compared to the OFDMA scheme. Unlike the OFDMA scheme, the UL NOMA scheme may not necessarily make multiple resources allocated to the terminals orthogonal to each other, and thus can generate a larger number of radio resources than the OFDMA scheme. Next, a UL NOMA scheme that uses spreading codes as NOMA resources will be described.

Figure 4:
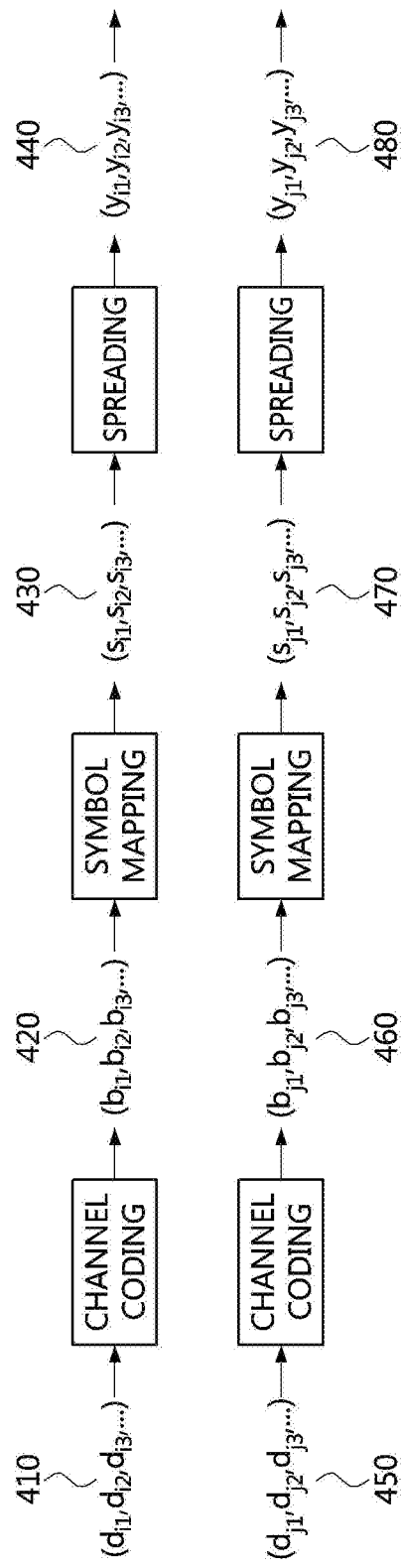
FIG. 4 is a conceptual diagram for explaining a NOMA scheme that uses spreading codes as NOMA resources.

FIG. 4 is a conceptual diagram for explaining a NOMA scheme that uses spreading codes as NOMA resources.

Referring to FIG. 4, different terminals use spreading codes as NOMA resources. The data sequence of each terminal (e.g., terminal i and terminal j) may be channel-coded and mapped to symbols, and then spread by a spreading code assigned to each terminal.

Through the channel coding and the symbol mapping, the data sequence 410 of the terminal i may be represented as a symbol sequence $S_i(S_i=(S_{i1}, S_{i2}, S_{i3}, \ldots))$ 430. Here, the result of the channel coding may also a bit sequence 420. Then, a spread symbol sequence 440 $Y_i$ may be generated by spreading the symbol sequence 430 using a spreading code $C_i(C_i=(C_{i1}, C_{i2}, C_{i3}, \ldots, C_{in}))$ assigned to the terminal i. Equation 1 below represents the spread symbol sequence $Y_i$ of the terminal i.

$$Y_i = (y_{i1}, y_{i2}, y_{i3}, y_{i4}, y_{i5} \ldots) = (S_{i1}c_{i1}, S_{i1}c_{i2}, \ldots, \quad \text{[Equation 1]}$$
$$S_{i1}c_{in}, S_{i2}c_{i1}, S_{i2}c_{i2}, \ldots ,$$
$$S_{i2}c_{in}, S_{i3}c_{i1}, S_{i3}c_{i2}, \ldots , S_{i3}c_{in}, \ldots)$$

Here, the spreading code $C_i(C_i=(C_{i1}, C_{i2}, C_{i3}, \ldots, C_{in}))$ assigned to the terminal i and a spreading code $C_j(C_j=(C_{j1}, C_{j2}, C_{j3}, \ldots, C_{jn}))$ assigned to the terminal j may be non-orthogonal spreading codes which are not necessarily orthogonal to each other. That is, $C_i \cdot C_j^* \neq 0$.

The data sequence 450 of the terminal j may also be channel-coded to a bit sequence 460, a symbol sequence 470 may be generated through symbol-mapping, and a spread symbol sequence 480 may be generated through spreading.

Equation 2 below represents a reception signal $R_k$ received at the base station. Data for the terminals i and j may be respectively spread to the spread symbol sequence 440 for the terminal i and the spread symbol sequence 480 for the terminal j, and then received as the reception signal $R_k$ at the base station through radio channels. Also, the reception signal $R_k$ may also be referred to as a 'reception signal sequence'.

$$R_k = (r_{1k}, r_{2k}, \ldots , r_{nk}) = (h_i S_{ik} c_{i1}, h_i S_{ik} c_{i2}, \ldots , \quad \text{[Equation 2]}$$
$$h_i S_{ik} c_{in}) + (h_j S_{jk} c_{j1}, h_j S_{jk} c_{j2}, \ldots ,$$
$$h_j S_{jk} c_{jn}) + (z_{1k}, z_{2k}, \ldots , z_{nk})$$

Here, $h_i$ may be a radio channel experienced by the data for the terminal i, and $h_j$ may be a radio channel experienced by the data for the terminal j. Here, $z_{1k}, z_{2k}, \ldots, z_{nk}$ may represent a noise signal sequence received at the base station.

When the base station receives data transmitted from the terminal i and restores the data, the base station may perform a despreading process. For example, the despreading process may be performed by multiplying the reception signal (the reception signal sequence) by $c_i^*$. Depending on the multiplication result between the spreading codes, interference from data of other terminals may or may not occur. That is, when $C_i \cdot C_j^* = 0$, the interference caused by the data from the terminal j may not occur. However, when $C_i \cdot C_j^* \neq 0$, the interference caused by the data from the terminal j may occur. The multiple access interference (MAI) due to the multiple accesses of multiple terminals may cause performance degradation in the NOMA communication system. Next, a NOMA scheme that uses subcarrier mapping patterns as NOMA resources will be described.

Figure 5:
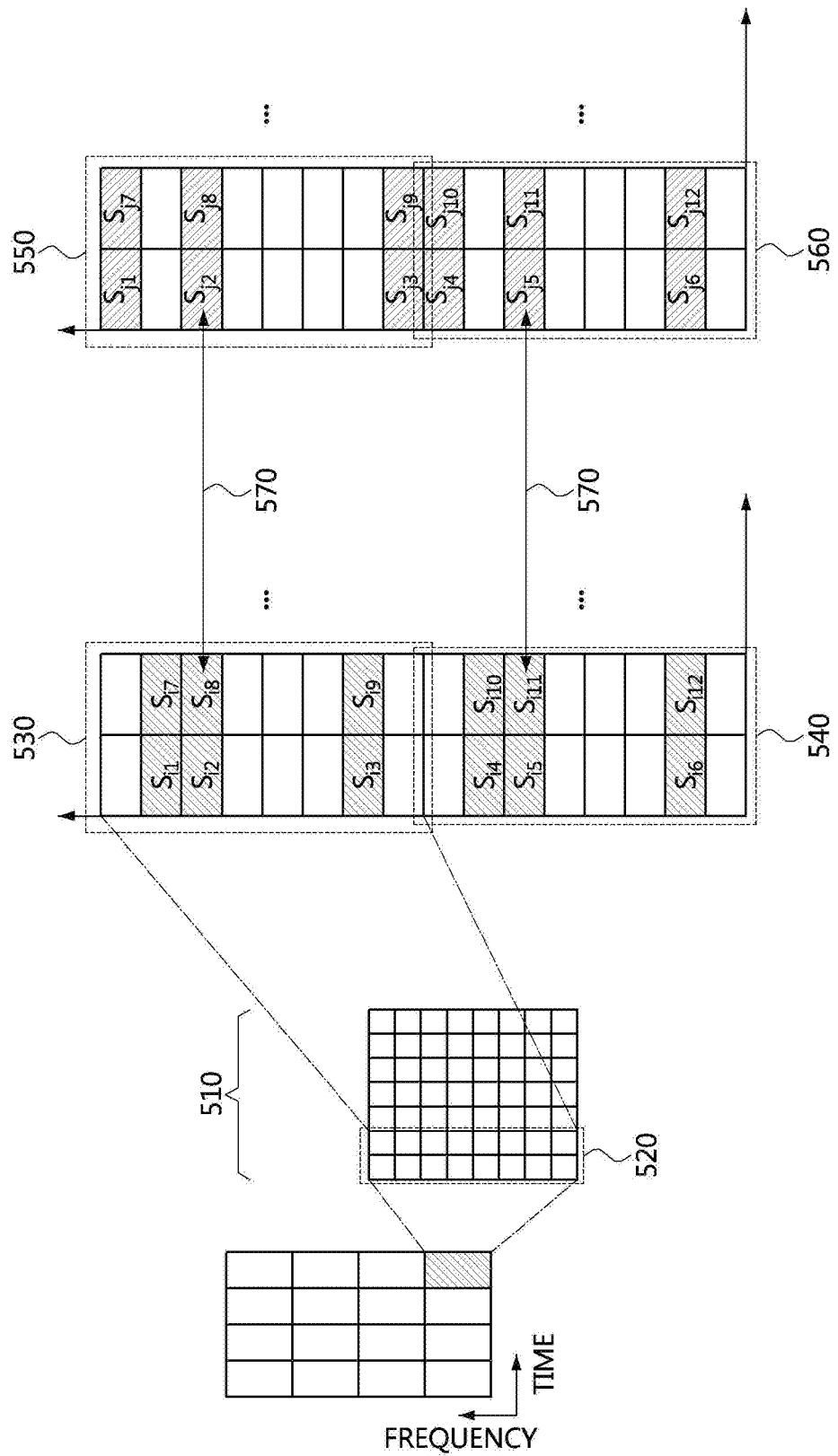
FIG. 5 is a conceptual diagram for explaining a NOMA scheme that uses subcarrier mapping patterns as NOMA resources.

FIG. 5 is a conceptual diagram for explaining a NOMA scheme that uses subcarrier mapping patterns as NOMA resources.

Referring to FIG. 5, OFDM symbols may be allocated at a specific subcarrier interval in a resource block (RB) 510, which is a basic unit for dynamic scheduling of an orthogonal multiple access scheme.

The RB 510 in the 3GPP LTE and LTE-A may consist of 1 slot corresponding to 7 symbols on the time axis and 12 subcarriers on the frequency axis. Here, 1 slot may have the length of 0.5 ms, and may be composed of 7 OFDM symbols in total. Also, a frequency band occupied by one subcarrier may be 15 KHz. A resource element (RE) 520 may consist of one subcarrier and one OFDM symbol. In case of a new radio (NR) system, which is the fifth generation mobile communication, various slot lengths, subcarrier spacing, and subcarrier number are supported, so that the size of an RB may vary.

Referring to FIG. 5, when one RB is configured to include 8 subcarriers, a plurality of terminals may be allocated to one RB by differently allocating subcarriers to which data is allocated for each terminal. Alternatively, one RB may be configured to include 16 subcarriers, and then 8 subcarriers may be grouped and processed internally. For example, the terminal i may be configured transmit data only on every second, third, and seventh subcarriers for each 8 subcarriers of the RB, and the terminal j may be configured to transmit data only on every first, third, and eighth subcarriers for each 8 subcarriers of the RB.

In this case, since the terminal i and the terminal j are simultaneously allocated in the third subcarrier 570, they may cause mutual interference. In the NOMA scheme based on the subcarrier resource mapping, a partial or total collision may occur between the resources allocated to terminals, thereby causing the MAI.

The magnitude of the MAI may be determined by such factors as channel gain, whether or not data is transmitted by other terminals, and transmission powers of other terminals. Specifically, the NOMA scheme may be used for an uplink grant-free transmission. In the grant-free transmission, periods for which radio resources are allocated but actual data transmission is not performed may exist. A ratio of such the periods may depend on the characteristics of the data traffic. Even when another terminal is allocated in the same frequency band and time, if the terminal does not perform data transmission in the allocated band and time, the MAI may not be caused from the terminal.

Also, when another terminal uses a large transmission power or when a channel gain is large due to a short distance between another terminal and a base station, the magnitude of interference from the corresponding terminal may become larger. In addition, the degree of cross-correlation between own multiple access radio resources and multiple access radio resources of other terminals may also affect the magnitude of the MAI.

That is, when the degree of cross-correlation between the spreading codes of the terminal i and the terminal j is 0 (i.e., orthogonal) as in the case of FIG. 4, there is no interference between the terminals. On the other hand, when the degree of cross-correlation is close to 1, a very large MAI may occur between both terminals. In the case of FIG. 5, when the number of colliding subcarriers is represented by the degree of cross-correlation, if the number of colliding subcarriers is large between the resource mapping patterns of the two terminals (i.e., the degree of cross-correlation is large), a very large MAI may occur between both terminals.

When the terminals allocated with multiple access resources (spreading codes and subcarriers) having a large degree of cross-correlation transmit data to the base station at the same time using the resources, the resulting MAI may increase. In particular, in the grant-free transmission, since the base station may not know in advance whether the terminal transmits data, it is difficult to predict the MAI at the time of data transmission. In this case, since adaptive transmission based on the signal-to-interference ratio prediction becomes difficult, the base station should transmit data to the terminal by lowering a data transmission rate.

If it is difficult to lower the data transmission rate in the base station, a probability of data transmission error may increase. Also, this may increase a need for data retransmission, which may cause problems in systems requiring low-delay communications such as the URLLC. Next, a configuration according to the present disclosure for preventing deterioration of system performance due to the variation of the MAI intensity will be described.

Figure 6:
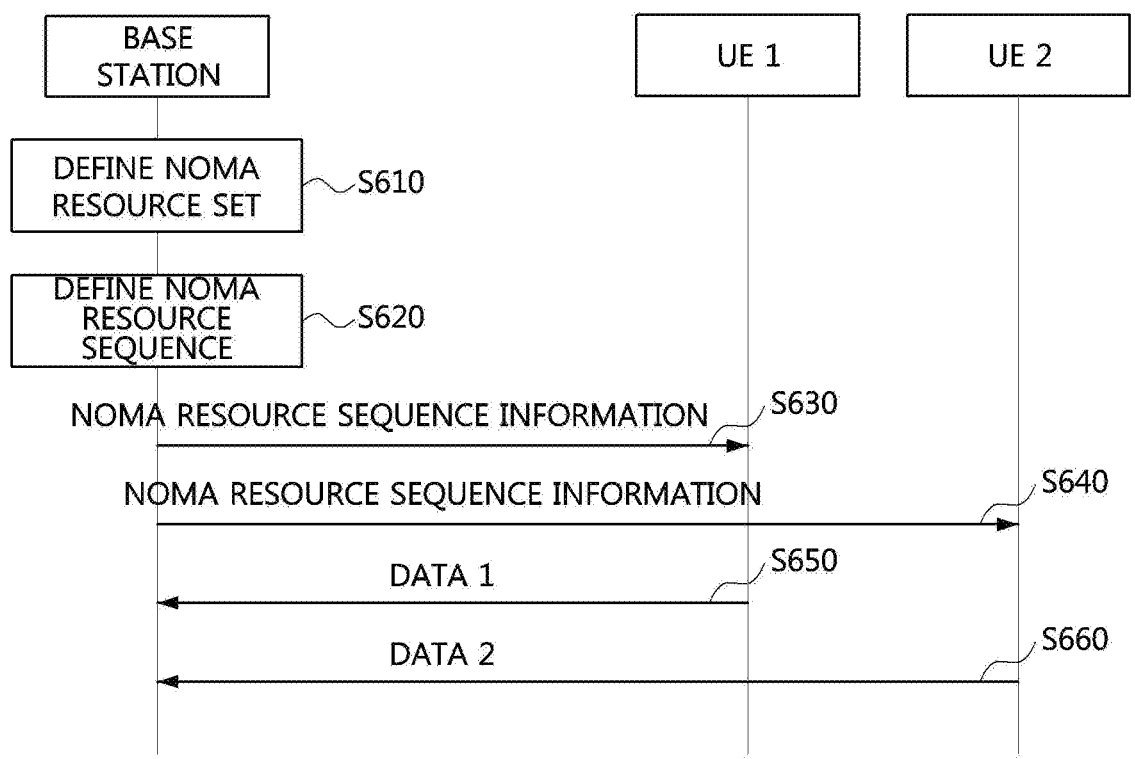
FIG. 6 is a sequence chart illustrating a NOMA resource allocation according to an embodiment of the present disclosure.

FIG. 6 is a sequence chart illustrating a NOMA resource allocation according to an embodiment of the present disclosure.

Referring to FIG. 6, when a plurality of terminals transmit data, NOMA resource sequence information may be allocated for each data symbol unit or data symbol group unit from a base station, thereby reducing the variability of MAI intensity among the terminals.

As described above, the magnitude of the MAI experienced in the radio channel by the data (collectively referred to as a data symbol or a data symbol group) that the terminal transmits to the base station may be determined by the degree of cross-correlation between its own data and data of other terminals. In an embodiment of the present disclosure, multiple access resources may be differently allocated to each data symbol or data symbol group transmitted by the terminal. This may make it possible to vary the magnitude of MAI experienced by each data, and consequently to significantly reduce the variability of the average MAI received at a particular point in time.

Specifically, a set of NOMA resources that can be used and allocated by the base station supporting the NOMA scheme may be defined (S610). In the following embodiments, the base station may support the NOMA scheme, and thus the communication system may be the NOMA communication system.

A spreading code may be a NOMA resource according to an embodiment of the present disclosure. In this case, a codebook in which spreading codes used in the communication system are collected may be referred to as a NOMA resource set. Also, a frequency resource mapping pattern (subcarrier mapping pattern) may be a NOMA resource according to another embodiment of the present disclosure. In this case, a set of frequency resource mapping patterns used in the communication system may be referred to as a NOMA resource set.

Then, the base station may define a sequence of available multiple access resources (i.e., NOMA resource sequence) (S620). Table 1 shows a transmission symbol sequence and a multiple access resource sequence when a spreading code is used as a NOMA resource according to an embodiment of the present disclosure.

TABLE 1

| Terminal number | Transmission symbol sequence | Multiple access resource sequence (spreading code: SF = 3) | Spread transmission sequence |
|---|---|---|---|
| i | $S_i^1, S_i^2, S_i^3, S_i^4,$ <br> ... | $Z_i^1, Z_i^2, Z_i^3, Z_i^4$ <br> ... | $S_i^1 z_i^1(1), S_i^1 z_i^1(2), S_i^1 z_i^1(3),$ <br> $S_i^2 z_i^2(1), S_i^2 z_i^2(2), S_i^2 z_i^2(3),$ <br> $S_i^3 z_i^3(1), S_i^3 z_i^3(2), S_i^3 z_i^3(3),$ <br> $S_i^4 z_i^4(1), S_i^4 z_i^4(2), S_i^4 z_i^4(3),$ <br> ... |

The spreading code $Z_i^j = \{z_i^j(1), z_i^j(2), z_i^j(3)\}$ which is a multiple access resource for the case when SF = 3

Here, in the case that a complex spreading code is used as $z_i^r(k)$, the spread transmission sequence may be a complex scalar, and in the case that a real spreading code is used as $z_i^r(k)$, the spread transmission sequence may be a real scalar. For example, when there are 4 terminals accessing the base station, the multiple access resources in the corresponding NOMA communication system may be expressed by Equation 3 below.

$$C_1 = (c_1(1), c_1(2), c_1(3))$$

$$C_2 = (c_2(1), c_2(2), c_2(3))$$

$$C_3 = (c_3(1), c_3(2), c_3(3))$$

$$C_4 = (c_4(1), c_4(2), c_4(3)) \qquad \text{[Equation 3]}$$

In this case, an example of a multiple access resource sequence allocated to each terminal may be expressed by Equation 4.

$$\text{UE1: } Z_1^1 = C_2, Z_1^2 = C_3, Z_1^3 = C_2, Z_1^4 = C_4, \ldots$$

$$\text{UE2: } Z_2^1 = C_1, Z_2^2 = C_4, Z_2^3 = C_1, Z_2^4 = C_2, \ldots$$

$$\text{UE3: } Z_3^1 = C_4, Z_3^2 = C_1, Z_3^3 = C_3, Z_3^4 = C_3, \ldots$$

$$\text{UE4: } Z_4^1 = C_3, Z_4^2 = C_2, Z_4^3 = C_4, Z_4^4 = C_1, \ldots \qquad \text{[Equation 4]}$$

In this case, the multiple access resources (spreading codes or subcarrier mapping patterns, etc.) allocated to the multiple access resource sequence may be repeated in a predetermined cycle unit (this may be referred to as 'multiple access resource rotation').

Table 2 shows a spread transmission signal sequence when using spreading codes according to an embodiment of the present disclosure as NOMA resources and a spread transmission signal sequence when using conventional fixed spreading codes as NOMA resources. Here, it is assumed that the cross-correlation between the spreading codes $C_1$ and $C_2$ is very large and the cross-correlation between the other spreading codes is very small.

Then, the base station may transmit information on the NOMA resource set and the NOMA resource sequence associated therewith determined in the previous step to the terminals (S630, S640). Here, the information on the NOMA resource set and the NOMA resource sequence transmitted to the terminals may be transmitted as included in system information.

Then, a terminal 1 (i.e., 'UE1') may transmit data (referred to as 'data 1' which is data from the UE1) to the base station using the NOMA resource set for the UE1 and the NOMA resource sequence associated therewith (S650). Also, a terminal 2 (i.e., 'UE2') may transmit data (referred to as 'data 2' which is data from the UE2) to the base station using the NOMA resource set for the UE2 and the NOMA resource sequence associated therewith (S660). Here, when allocating multiple access resources according to the NOMA resource sequence, the multiple access resources may be allocated on a transmission symbol basis or on a transmission symbol group basis.

In the conventional system, a spreading code pair having a large cross-correlation is used for the UE1 and the UE2 during all time slots. Assuming that the cross-correlation between the spreading codes $C_1$ and $C_2$ is very large and the cross-correlation between the spreading code pair and other spreading codes is very small, when the UE2 does not perform data transmission, the data of the UE1 may receive a small MAI from data for a terminal 3 (i.e., 'UE3') and a terminal 4 (i.e., 'UE4'). On the other hand, when the UE2 performs data transmission, the data of the UE1 may receive a very large MAI from the data for the UE2. That is, the degree of interference to the UE1 may vary depending on whether or not the UE2 transmits data.

In particular, when the degree of interference variation due to data communication with other grant-free terminals is large, it may be difficult for the base station to predict the SINR for the data of the terminal so that it may be difficult to perform the adaptive transmission. When the UE1 transmits data at a high data rate under assumption that the interference between the base station and the terminal is small, a probability that a data reception error for the data of the UE1 occurs may increase if the UE2 transmits data to the base station. In this case, frequent data retransmissions may be caused and a transmission delay may become large. In contrast, when the terminal assumes a large interference between the base station and the terminal and transmits data to the base station at a low data rate, overall system throughput will be poor.

TABLE 2

| Time slot | UE1 Proposed | UE1 Conventional | UE2 Proposed | UE2 Conventional | UE3 Proposed | UE3 Conventional | UE4 Proposed | UE4 Conventional |
|---|---|---|---|---|---|---|---|---|
| 1 | $S_1^1 C_2(1)$ | $S_1^1 C_2(1)$ | $S_2^1 C_1(1)$ | $S_2^1 C_1(1)$ | $S_3^1 C_4(1)$ | $S_3^1 C_4(1)$ | $S_4^1 C_3(1)$ | $S_4^1 C_3(1)$ |
| 2 | $S_1^1 C_2(2)$ | $S_1^1 C_2(2)$ | $S_2^1 C_1(2)$ | $S_2^1 C_1(2)$ | $S_3^1 C_4(2)$ | $S_3^1 C_4(2)$ | $S_4^1 C_3(2)$ | $S_4^1 C_3(2)$ |
| 3 | $S_1^1 C_2(3)$ | $S_1^1 C_2(3)$ | $S_2^1 C_1(3)$ | $S_2^1 C_1(3)$ | $S_3^1 C_4(3)$ | $S_3^1 C_4(3)$ | $S_4^1 C_3(3)$ | $S_4^1 C_3(3)$ |
| 4 | $S_1^2 C_3(1)$ | $S_1^2 C_2(1)$ | $S_2^2 C_4(1)$ | $S_2^2 C_1(1)$ | $S_3^2 C_1(1)$ | $S_3^2 C_4(1)$ | $S_4^2 C_2(1)$ | $S_4^2 C_3(1)$ |
| 5 | $S_1^2 C_3(2)$ | $S_1^2 C_2(2)$ | $S_2^2 C_4(2)$ | $S_2^2 C_1(2)$ | $S_3^2 C_1(2)$ | $S_3^2 C_4(2)$ | $S_4^2 C_2(2)$ | $S_4^2 C_3(2)$ |
| 6 | $S_1^2 C_3(3)$ | $S_1^2 C_2(3)$ | $S_2^2 C_4(3)$ | $S_2^2 C_1(3)$ | $S_3^2 C_1(3)$ | $S_3^2 C_4(3)$ | $S_4^2 C_2(3)$ | $S_4^2 C_3(3)$ |
| 7 | $S_1^3 C_2(1)$ | $S_1^3 C_2(1)$ | $S_2^3 C_1(1)$ | $S_2^3 C_1(1)$ | $S_3^3 C_3(1)$ | $S_3^3 C_4(1)$ | $S_4^3 C_4(1)$ | $S_4^3 C_3(1)$ |
| 8 | $S_1^3 C_2(2)$ | $S_1^3 C_2(2)$ | $S_2^3 C_1(2)$ | $S_2^3 C_1(2)$ | $S_3^3 C_3(2)$ | $S_3^3 C_4(2)$ | $S_4^3 C_4(2)$ | $S_4^3 C_3(2)$ |
| 9 | $S_1^3 C_2(3)$ | $S_1^3 C_2(3)$ | $S_2^3 C_1(3)$ | $S_2^3 C_1(3)$ | $S_3^3 C_3(3)$ | $S_3^3 C_4(3)$ | $S_4^3 C_4(3)$ | $S_4^3 C_3(3)$ |
| 10 | $S_1^4 C_4(1)$ | $S_1^4 C_2(1)$ | $S_2^4 C_2(1)$ | $S_2^4 C_1(1)$ | $S_3^4 C_1(1)$ | $S_3^4 C_4(1)$ | $S_4^4 C_1(1)$ | $S_4^4 C_3(1)$ |
| 11 | $S_1^4 C_4(2)$ | $S_1^4 C_2(2)$ | $S_2^4 C_2(2)$ | $S_2^4 C_1(2)$ | $S_3^4 C_1(2)$ | $S_3^4 C_4(2)$ | $S_4^4 C_1(2)$ | $S_4^4 C_3(2)$ |
| 12 | $S_1^4 C_4(3)$ | $S_1^4 C_2(3)$ | $S_2^4 C_2(3)$ | $S_2^4 C_1(3)$ | $S_3^4 C_3(3)$ | $S_3^4 C_4(3)$ | $S_4^4 C_1(3)$ | $S_4^4 C_3(3)$ |
| … | … | … | … | … | … | … | … | … |

However, in the case of the non-orthogonal radio resource allocation method according to an embodiment of the present disclosure, the UE1 may use spreading codes $C_1$ and $C_2$, which is a spreading code pair having a large cross-correlation, in common with the UE2 during only 6 time slots among 12 time slots. Thus, when the UE2 does not transmit data, the data of the UE1 may receive little interference. Also, even when the UE2 transmits data, the data of the UE1 may receive a large interference only during 6 time slots among 12 time slots and receive a small interference during the remaining time slots.

Similarly, the UE4 may simultaneously use a spreading code having a large cross-correlation with the UE2 during 3 time slots among 12 time slots and may simultaneously a spreading code having a large cross-correlation with the UE3 during another 3 time slots. Like this, in the case of the spreading code allocation according to the conventional art, the spreading code pair causing a large interference may be dominated by a specific terminal, and the variability of the MAI caused by the data transmission of the terminal is very severe.

However, according to the embodiment of the present disclosure, in which different spreading codes are be used for each data symbol and data symbol group, it is possible to distribute spreading code pairs causing a large interference to a plurality of terminal pairs. Accordingly, the interference variability can be reduced considerably, the number of retransmissions due to transmission errors can be reduced, and the yield of the entire system efficiency can be improved. Next, a method of using a subcarrier mapping pattern on a frequency band will be described as a NOMA resource allocation method according to another embodiment of the present disclosure.

Figure 7:
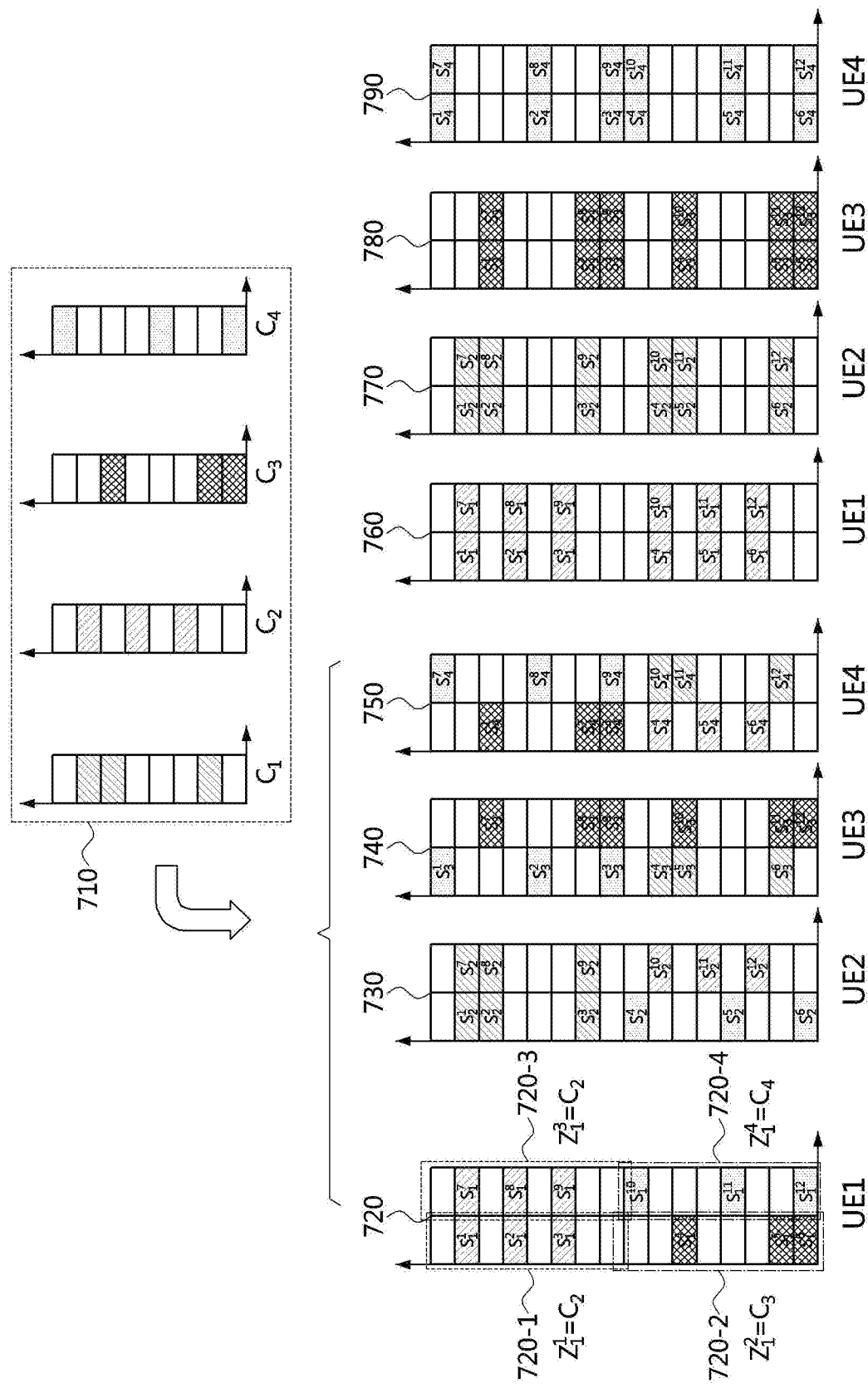
FIG. 7 is a conceptual diagram for explaining a NOMA resource allocation according to another embodiment of the present disclosure.

FIG. 7 is a conceptual diagram for explaining a NOMA resource allocation according to another embodiment of the present disclosure.

Referring to FIG. 7, different subcarrier mapping patterns may be assigned to terminals according to a NOMA resource sequence indicating a subcarrier mapping pattern.

A NOMA resource set 710 having NOMA resources to be mapped to consecutive 8 sub-carriers as its elements may be defined. In an embodiment of the present disclosure shown in FIG. 7, the NOMA resource set 710 having 4 different NOMA resources ($C_1, C_2, C_3, C_4$) as elements may be used. However, this is only an example according to an embodiment of the present disclosure, a NOMA resource set may be configured to include more or fewer NOMA resources, and the number of sub-carriers in each NOMA resource and the mapping pattern therefor may be configured differently.

Table 3 below shows that multiple access resources are allocated to four different terminals using a NOMA sequence composed of four NOMA resources according to another embodiment of the present disclosure.

TABLE 3

| Terminal number (Terminal i) | Multiple access resource sequence( $Z_i^1, Z_i^2, Z_i^3, Z_i^4$ ) |
|---|---|
| UE1 | $Z_1^1 = C_2, Z_1^2 = C_3, Z_1^3 = C_2, Z_1^4 = C_4$ |
| UE2 | $Z_2^1 = C_1, Z_2^2 = C_4, Z_2^3 = C_1, Z_2^4 = C_2$ |
| UE3 | $Z_3^1 = C_4, Z_3^2 = C_1, Z_3^3 = C_3, Z_3^4 = C_3$ |
| UE4 | $Z_4^1 = C_3, Z_4^2 = C_2, Z_4^3 = C_4, Z_4^4 = C_1$ |

Here, the length of the NOMA resource sequence is not limited to the embodiment of Table 2, but may be shorter or longer, and a method of generating the NOMA resource sequence will be described later.

Table 4 below shows the number of colliding subcarriers for a case where multiple access resources are allocated to four terminals using the NOMA resource sequence according to another embodiment of the present disclosure shown in Table 3, and a case where multiple access resources are allocated to four terminals using a conventional method.

TABLE 4

| Interfering UE | UE1 | | UE2 | | UE3 | | UE4 | |
|---|---|---|---|---|---|---|---|---|
| | Proposed | Conventional | Proposed | Conventional | Proposed | Conventional | Proposed | Conventional |
| UE1 | — | — | 3 | 4 | 3 | 0 | 0 | 0 |
| UE2 | 3 | 4 | — | — | 2 | 8 | 3 | 0 |
| UE3 | 3 | 0 | 2 | 8 | — | — | 5 | 4 |
| UE4 | 0 | 0 | 3 | 0 | 5 | 4 | — | — |
| total | 6 | 4 | 8 | 12 | 10 | 12 | 8 | 4 |

Referring to Table 4, the number of collisions between the total subcarriers in the embodiment of the present disclosure and the number of collisions between the total subcarriers according to the conventional art are equal to 32. However, in the conventional art, the subcarrier collisions are concentrated between specific terminals. That is, the UE1 may have concentrated collisions with the UE2, the UE2 may have concentrated collisions with the UE1 and the UE3, the UE3 may have concentrated collisions with the UE2 and the UE4, and the UE4 may have concentrated collisions with the UE3. This means that there is a large variability of MAI depending on whether a specific terminal transmits data to another specific terminal.

However, in the case of the multiple access resource allocation scheme according to another embodiment of the present disclosure, since the MAI experienced by each terminal may be uniformly distributed, the variability of MAI may become small by being less influenced by presence or absence of data transmission of a specific terminal. This feature makes it possible to perform adaptive transmission more stably in the base station because the MAI is not extremely large or small (i.e., dispersion of MAI is small).

Meanwhile, as shown in Tables 3 and 4, it can be seen that the NOMA resource sequence indicating with which pattern the NOMA resources are assigned greatly affects the variability of MAI between the terminals. Next, a method for generating a NOMA resource sequence according to an embodiment of the present disclosure for reducing variability of MAI will be described.

Figure 8:
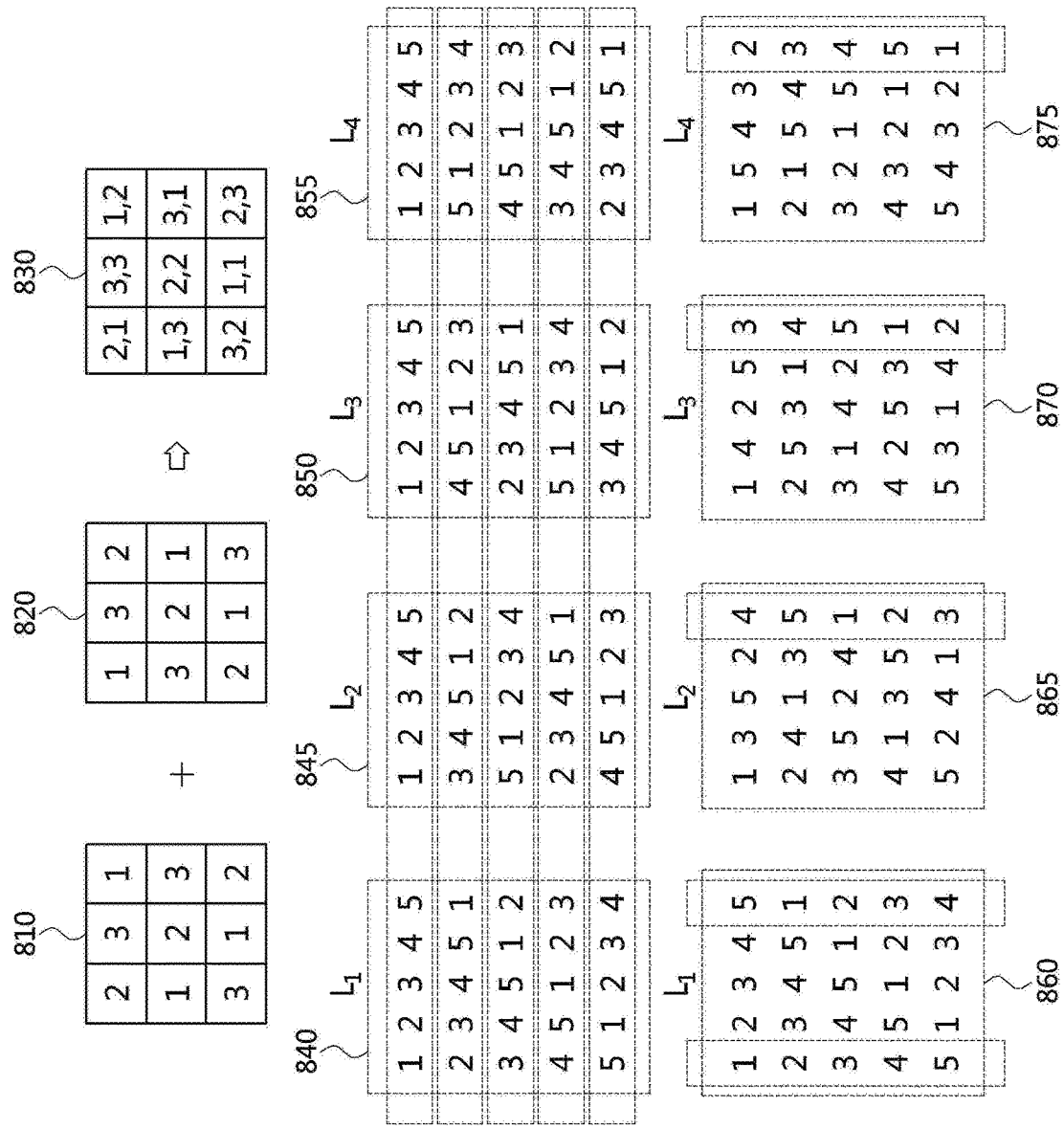
FIG. 8 is a conceptual diagram for explaining a Latin square and an orthogonal Latin square for generating a NOMA resource sequence according to an embodiment of the present disclosure.

FIG. 8 is a conceptual diagram for explaining a Latin square and an orthogonal Latin square for generating a NOMA resource sequence according to an embodiment of the present disclosure.

Referring to FIG. 8, there is shown a method of generating a 3×3 orthogonal Latin square matrix using examples of 3×3 Latin square matrices and an example of a 4×4 Latin square matrix. First, the Latin square and the orthogonal Latin square will be described. An N×N Latin square matrix may mean a matrix in which each row and column of the matrix includes a number from 1 to N only once. That is, each row of the matrix contains a number from 1 to N only once, and each column of the matrix also contains a number from 1 to N only once.

When $A_{ij}$ is a (i,j)-th element of a matrix A and $B_{ij}$ is a (i,j)-th element of matrix B, if the two Latin square matrices A and B having the same dimension satisfy Equation 5 below, the matrices A and B may be mutually-orthogonal Latin sequence matrices.

$$(A_{ij}, B_{ij}) \neq (A_{mn}, B_{mn}), \text{ all of } (i,j) \neq (m,n) \quad \text{[Equation 5]}$$

Referring to FIG. 8, each row and column of a new 3×3 matrix 803, which is obtained by representing elements of the same row and column in the two 3×3 Latin square matrices 810 and 820 as a group, satisfy the condition of Equation 5, the matrices A and B may be mutually-orthogonal Latin square matrices. It has been mathematically proven that there are (N−1) mutually-orthogonal Latin square matrices for the N×N Latin square matrix.

A method for generating a NOMA resource sequence according to an embodiment of the present disclosure is as follows, using the properties of the Latin square and the mutually-orthogonal Latin square. First, when N denotes the size of the NOMA resource set, N different NOMA resource sequences may be generated. This may mean that the number of grant-free terminals with a radio link established in the NOMA communication system is N.

Table 5 shows definitions of symbols used in generating the NOMA resource sequence according to an embodiment of the present disclosure.

TABLE 5

| Symbol | Definition |
| --- | --- |
| $Z_i$ | i-th NOMA resource sequence |
| $Z_i^t$ | t-th value in i-th NOMA resource sequence |
| $L_1, L_2, L_3, \ldots, L_{N-1}$ | N × N mutually-orthogonal Latin square |
| $L_k^{pq}$ | Element in p-th row and q-th column of Latin square $L_k^{pq}$ |

Equation 6 below shows a method for generating a mutually-orthogonal Latin square related to the generation of a NOMA resource sequence according to an embodiment of the present disclosure. The first row of every $L_k$ may be configured to 1, 2, ..., N. The value in the q-th column and the p-th row of $L_k$ may be configured using Equation 6 (assuming N is a prime number).

$$L_k^{pq} = (q + k(p-1) - 1) \bmod N + 1 \quad \text{[Equation 6]}$$

Equation 7 shows a method for determining $Z_i^t$, which is a value at a specific location (i.e., t-th) of the NOMA resource sequence according to an embodiment of the present disclosure (according to the symbols in Table 5).

$$Z_i^t = L_{v+1}^{i(v+1)}, \text{ where } t=(N-1)*N*u+N*v+w \quad \text{[Equation 7]}$$

Here, u and v are non-negative integers, w is one of ({0, 1, 2, ..., N−1}). Also, when the terminal i uses a multiple access resource p, the opportunity for the terminal j to use a multiple access resource q may be the same for all cases where i≠j and p≠q.

In all the rows of the mutually-orthogonal Latin square, all numbers from 1 to N exist exactly once. This means that there is no case in which the same resource is redundantly allocated during N multiple access resource allocations to a terminal, and a specific resource is allocated to a terminal only once during the N multiple access resource allocations. That is, among N×(N−1) multiple access resource allocations, allocation of any specific resource is performed only (N−1) times.

Since the first row of the k-th mutually-orthogonal Latin square matrix $L_k$ is 1, 2, ..., N, and the p-th row thereof has values each of which is obtained by adding 1 to a value obtained by performing a modulation N (mod N) operation on a value obtained by adding k(p−1)−1 to the corresponding value of the first row, a difference between the p-th row vector and the p'-th row vector of the mutually-orthogonal Latin square matrix $L_k$ may be represented by Equation 8.

$$\{k(p-p') \bmod N, k(p-p') \bmod N, \ldots, k(p-p') \bmod N\} \quad \text{[Equation 8]}$$

Similarly, a difference between the p-th row vector and the p'-th row vector of the mutually-orthogonal Latin square matrix $L_{k'}$ may be expressed by Equation 9.

$$\{k'(p-p') \bmod N, k'(p-p') \bmod N, \ldots, k'(p-p') \bmod N\} \quad \text{[Equation 9]}$$

Here, a difference $V_{kk'}^{pp'}$ between the p-th row vector and the p'-th row vector of the mutually-orthogonal Latin square matrixes k and k' may be expressed by Equation 10.

$$\begin{aligned} V_{kk'}^{pp'} &= \{k(p-p') \bmod N, k(p-p') \bmod N, \ldots, \\ &\quad k(p-p') \bmod N\} - \{k'^{(p-p')} \bmod N, \\ &\quad k'^{(p-p')} \bmod N, \ldots, k'^{(p-p')} \bmod N\} \\ &= \{(k-k')(p-p') \bmod N, \\ &\quad (k-k')(p-p') \bmod N, \ldots, \\ &\quad (k-k')(p-p') \bmod N \end{aligned} \quad \text{[Equation 10]}$$

Here, if k≠k' and p≠p', any elements of $V_{kk'}^{pp'}$ are not zero. Also, p and q are numbers from 1 to N, and k is a number from 1 to N−1.

Also, in the case that $L_k^{pq}$ denotes a NOMA resource allocated to the (kN+q)-th time period, when $(L_k^{pq}, L_k^{p'q}) = (L_{k'}^{pq'}, L_{k'}^{p'q'})$ for arbitrary p, p', q, q', k, and k' satisfying p≠p' and q≠q', the possibility of multiple access resource allocation in the following two cases is as follows.

1) A case when k=k'

When $(L_k^{pq}, L_k^{p'q}) = (L_{k'}^{pq'}, L_{k'}^{p'q'})$, $L_k^{p'q} - L_k^{p'q'}$ should be 0. However, $L_k^{p'q} - L_k^{p'q'} = k(p-p') \bmod N$ according Equation 8. Here, k is a number from 0 to (N−1), and (p−p') is a number from 0 to (N−1). In this case, a condition of (k(p−p') mod N=0) cannot be satisfied for any of k, p, p', q, and q'. Therefore, when k=k', the same multiple access resource pair is not allocated to the two UEs.

2) A case when k≠k'

In this case, when $(L_k^{pq}, L_k^{p'q}) = (L_{k'}^{pq'}, L_{k'}^{p'q'})$, $L_k^{pq} - L_{k'}^{pq'}$ should be 0, and $L_k^{p'q} - L_{k'}^{p'q'}$ also should be 0. This may be expressed by Equations 11 and 12 using Equation 6.

$$L_k^{pq} - L_{k'}^{pq'} = 0 \Leftrightarrow (q+k(p-1)-1) \bmod N+1 = (q'+k'^{(p-1)}-1) \bmod N+1 \Leftrightarrow (q-q') \bmod N = (k'-k)(p-1) \bmod N \quad \text{[Equation 11]}$$

$$L_k^{p'q} - L_{k'}^{p'q'} = 0 \Leftrightarrow (q+k(p'-1)-1) \bmod N+1 = (q'+k'^{(p'-1)}-1) \bmod N+1 \Leftrightarrow (q-q') \bmod N = (k'-k)(p'-1) \bmod N \quad \text{[Equation 12]}$$

A result as shown in Equation 13 may be derived from Equations 11 and 12.

$$(k'-k)(p-1) \bmod N = (k'-k)(p'-1) \bmod N \quad \text{[Equation 13]}$$

In this case, a condition of (p=p') should be satisfied for Equation 13 to be established, but it is not established because it violates the prerequisites of (p≠p' and q≠q'). Therefore, any p, p', q, q', k, and k' (p≠p', q≠q', k≠k') satisfying the condition of $((L_k^{pq}, L_k^{p'q}) = (L_{k'}^{pq'}, L_{k'}^{p'q'}))$ do not exist. Accordingly, there is not a case where two different NOMA sequences redundantly allocate the same multiple access resource pair during N×(N−1) time periods.

In addition, when there are two arbitrary NOMA resource sequences, the total number of multiple access resource pairs capable of multiple access resource allocation is N×(N−1).

As described above, since there is no case where the same multiple access resource pairs are redundant during N×(N−1) time periods, only one multiple access resource pair exists only once during N×(N−1) time periods.

Table 6 shows a NOMA resource sequence generated through the mutually-orthogonal Latin square according to an embodiment of the present disclosure when N=5.

TABLE 6

| Sequence No. | Multiple access resource sequence |
|---|---|
| Sequence 1 | 1 2 3 4 5 1 2 3 4 5 1 2 3 4 5 1 2 3 4 5 |
| Sequence 2 | 2 3 4 5 1 3 4 5 1 2 4 5 1 2 3 5 1 2 3 4 |
| Sequence 3 | 3 4 5 1 2 5 1 2 3 4 2 3 4 5 1 4 5 1 2 3 |
| Sequence 4 | 4 5 1 2 3 2 3 4 5 1 5 1 2 3 4 3 4 5 1 2 |
| Sequence 5 | 5 1 2 3 4 4 5 1 2 3 3 4 5 1 2 2 3 4 5 1 |

The NOMA resource sequence in Table 6 is the same as $L_1$ 840, $L_2$ 845, $L_3$ 850, . . . , and $L_K$ 855 of Table 8.

Meanwhile, in applying the NOMA scheme, it is also possible to use non-orthogonal resource division among groups and orthogonal resource division in a group after grouping terminals. Hereinafter, a method of generating a NOMA resource sequence usable in such the case will be described.

First, the following assumptions may be made. Each terminal group may have N orthogonal resources. In this case, the N orthogonal resources of each terminal group may be the same or may not be the same. Each terminal group may be composed of N terminals, and N−1 terminal groups may be assumed.

$Z_{gi}$ may be defined as the i-th NOMA resource sequence of the g-th group. When the t-th value of this NOMA resource sequence is defined as $Z_{gi}^t$, $Z_{gi}^t$ may be defined as shown in Equation 14. Others follow the definition in Table 4.

$$Z_{gi}^t = L_g^{i(w+1)}, \text{ where } t = N*v+w \quad \text{[Equation 14]}$$

Here, v is a non-negative integer and w is one of {0, 1, 2, . . . , N−1}.

Table 7 shows a NOMA resource sequence of the terminal group 4 generated through a mutually-orthogonal Latin square according to an embodiment of the present disclosure when N=5.

TABLE 7

| Sequence No. | Multiple access resource sequence of terminal group 4 |
|---|---|
| Sequence 1 | 1 5 4 3 2 1 5 4 3 2 1 5 4 3 2 1 5 4 3 2 |
| Sequence 2 | 2 1 5 4 3 2 1 5 4 3 2 1 5 4 3 2 1 5 4 3 |
| Sequence 3 | 3 2 1 5 4 3 2 1 5 4 3 2 1 5 4 3 2 1 5 4 |
| Sequence 4 | 4 3 2 1 1 4 3 2 1 1 4 3 2 1 1 4 3 2 1 1 |
| Sequence 5 | 5 4 3 2 2 5 4 3 2 2 5 4 3 2 2 5 4 3 2 2 |

Using the NOMA resource sequence obtained through the above procedure, the same NOMA resources may not be used in the terminal group (i.e., orthogonality between NOMA resources). The opportunity that the terminal i uses the NOMA resource p and the terminal j in the other terminal group uses the NOMA resource q is the same for all i, j, p, and q, so that the variability of MAI becomes very small. Next, the variability of the MAI in the case of using a NOMA resource sequence according to an embodiment of the present disclosure will be mathematically described.

Table 8 shows definitions of symbols for explaining the reduction in the variability of MAI in the case of using a NOMA resource sequence according to an embodiment of the present disclosure.

TABLE 8

| Symbol | Definition |
|---|---|
| s | A pattern for allocating N NOMA resource sequences to N terminals |
| s' | A patter for allocating N NOMA resource sequence sets generated according to an embodiment of the present disclosure to N terminals |
| U | A set of all terminals |
| A | A set of terminals that actually perform data transmission (A ⊂ U) |
| T(n) | When n terminals in the communication system transmit data at the same time, a set having sets of terminals that perform data transmission as its elements. That is, {A: ‖A‖ = n} |
| $IR_i$(s, A) | When a terminal in a set A transmits data in the NOMA communication system in the case of a pattern s that maps NOMA resource sequences and terminals, the total amount of interferences to other terminals in the set A excluding the terminal itself |
| IRX(s, A) | Interference amount of the terminal under the maximum interference (i.e., IRX(s, A) = $\max_i IR_i$(s, A)) |
| $\overline{IRX}$(s, n) | Among various combinations of transmitters, where n transmitters transmit at the same time, the maximum value of $IRX_i$(s, A) (i.e., $\overline{IRX}$(s, n) = $\max_{A \in T(n)}$ IRX(s, A)) |

TABLE 8-continued

| Symbol | Definition |
| --- | --- |
| $IT_i(s, A)$: | When a terminal in a set A transmits data in the NOMA communication system in the case of a pattern s that maps NOMA resource sequences and terminals, the total amount of interferences caused by a terminal i to other terminals in the set A excluding the terminal i |
| $I_i(s, j)$: | In the NOMA communication system in the case of a pattern s that maps NOMA resource sequences and terminals, the amount of interference caused by a terminal j to a terminal i |

According to the definitions of Table 8, $IR_i(s,A)$ may be expressed by Equation 15 and Equation 16.

$$IR_i(s, A) = \sum_{j \in A, i \neq j} I_i(s, j) \quad \text{[Equation 15]}$$

$$\sum_{i \in A} IR_i(s, A) = \sum_{i \in A} IT_i(s, A) \quad \text{[Equation 16]}$$

In this case, when n terminals simultaneously transmit data in the NOMA communication system (or, when the base station transmits data to n terminals simultaneously), the total amount of interference received by one terminal may vary according to NOMA resource sequences allocated to other terminals and which terminals among n terminals actually transmit data. Therefore, it is important to minimize the MAI when the largest MAI occurs when n terminals simultaneously transmit data.

For this, when designing s, the value of $\overline{IRX}(s, n)$ should be as small as possible for most n. The concrete procedure is as follows.

When all terminals in the NOMA communication system transmit data, all the multiple access resources are used. Here, if the transmission powers and the channel gains of the transmitting terminals are the same, the total amount of interference received by the NOMA communication system is the same regardless of the allocation pattern s. That is, for all of $s_1$ and $s_2$, a relational expression as shown in Equation 17 may be established $$\sum_{i \in U} IR_i(s_1, U) = \sum_{i \in U} IR_i(s_2, U) \quad \text{[Equation 17]}$$

Meanwhile, Equation 18 and Equation 19 are established for all $i_1$ and $i_2$ regardless of A due to the same frequency characteristics on multiple access resources according to the multiple access resource sequence allocation pattern according to an embodiment of the present disclosure.

$$IR_{i_1}(s',A)=IR_{i_2}(s',A)=IT_{i_1}(s',A)=IT_{i_2}(s',A) \quad \text{[Equation 18]}$$

$$I_{i_1}(s',j_1)=I_{i_2}(s',j_2)=I_o(s') \quad \text{[Equation 19]}$$

As a result, Equation 20 may be established.

$$\Sigma_{i \in U} IR_i(s,U)=\Sigma_{i \in U} IR_i(s',U)=N^*IR_i(s',U)=N^*(N-1)^*I_o(s') \quad \text{[Equation 20]}$$

Also, as shown in Equation 17, the interference in the NOMA communication system is the same regardless of the multiple access resource sequence allocation pattern, and the reception interference amount of all terminals is the same in terms of allocation of s'. In the case of a usual s, the reception interference amount may be different for each terminal. In the case of s', the reception interference amounts of all terminals are equal to each other, so that the interference of terminal may be expressed by Equation 21.

$$\overline{IRX}(s',N)=IRX(s',U)=(N-1)^*I_o(s') \quad \text{[Equation 21]}$$

On the other hand, according to the definition of $\overline{IRX}(s, N)$ and that the total interference amount in the general s is the same, Equation 22 may be established.

$$\overline{IRX}(s,N) \geq \overline{IRX}(s',N) \quad \text{[Equation 22]}$$

Accordingly, when n=N, it can be seen that the maximum amount of MAI that can be received by the terminal is always superior to that of any other s by applying the multiple access resource allocation according to an embodiment of the present disclosure.

Meanwhile, when n=(N−1), when any terminal j of N terminals does not transmit data in the case of s', Equations 23 and 24 may be always established irrespective of the terminal j.

$$\sum_{i \in U - \{j\}} IR_i(s', U - \{j\}) = \quad \text{[Equation 23]}$$
$$\sum_{i \in U} IR_i(s', U) - 2(N-1)I_o(s') = (N-1)(N-2)I_o(s')$$

$$\overline{IRX}(s', N-1) = (N-2) * I_o(s') \quad \text{[Equation 24]}$$

Similarly, Equation 25 may be established when the terminal i having the smallest interference amount does not transmit data, and Equation 26 may be established because the total interference amount is also large in the usual s.

$$\sum_{i \in U - \{\hat{1}\}} IR_i(s', U - \{\hat{1}\}) \leq \sum_{i \in U - \{\hat{1}\}} IR_i(s, U - \{\hat{1}\}) \quad \text{[Equation 25]}$$

$$\overline{IRX}(s, N-1) \geq \overline{IRX}(s', N-1) \quad \text{[Equation 26]}$$

Therefore, when n=N−1, if the multiple access resource allocation scheme according to an embodiment of the present disclosure is used, the maximum amount of MAI that can be received by the terminal is always superior to that of any other s. Similarly, when n=N−2, n=N−3, ..., or n=1, the same result can be obtained. Therefore, when the multiple access resource sequence allocation according to an embodiment of the present disclosure is used, the maximum interference amount received by the terminal for all n is minimized. Next, the reduction in the variability of MAI in the case of using the NOMA resource sequence according to an embodiment of the present disclosure will be described as a simulation result.

An environment for simulation is as follows. When all terminals transmit data, the terminals perform the data transmission with the same transmission power. The transmission power may be normalized to 1 per multiple access resource. The channel gain of all the terminals is 1. There are 5 NOMA resources in the NOMA communication system. As simulation target NOMA resource sequences, the NOMA resource sequence of Table 9 according to an embodiment of the present disclosure, the arbitrary sequence scheme of Table 10, and the fixed sequence scheme that does not rotate multiple access resources of Table 11 are used.

amount of interference. In the case of the fixed scheme, a variation of MAI between the terminals is very large, and it can be confirmed that the deviation can be reduced by the arbitrary sequence. Also, a deviation of MAIs is about 10% in the case of the arbitrary sequence scheme, and it can be confirmed that this deviation is completely eliminated by using the multiple access resource allocation method according to the embodiment of the present disclosure.

TABLE 9

| | Time period (time slot) | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Sequence 1 | 1 | 2 | 3 | 4 | 5 | 1 | 2 | 3 | 4 | 5 | 1 | 2 | 3 | 4 | 5 | 1 | 2 | 3 | 4 | 5 |
| Sequence 2 | 2 | 3 | 4 | 5 | 1 | 3 | 4 | 5 | 1 | 2 | 4 | 5 | 1 | 2 | 3 | 5 | 1 | 2 | 3 | 4 |
| Sequence 3 | 3 | 4 | 5 | 1 | 2 | 5 | 1 | 2 | 3 | 4 | 2 | 3 | 4 | 5 | 1 | 4 | 5 | 1 | 2 | 3 |
| Sequence 4 | 4 | 5 | 1 | 2 | 3 | 2 | 3 | 4 | 5 | 1 | 5 | 1 | 2 | 3 | 4 | 3 | 4 | 5 | 1 | 2 |
| Sequence 5 | 5 | 1 | 2 | 3 | 4 | 4 | 5 | 1 | 2 | 3 | 3 | 4 | 5 | 1 | 2 | 2 | 3 | 4 | 5 | 1 |

TABLE 10

| | Time period (time slot) | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Sequence 1 | 1 | 3 | 4 | 3 | 1 | 3 | 2 | 1 | 4 | 1 | 3 | 2 | 5 | 1 | 2 | 4 | 4 | 1 | 3 | 4 |
| Sequence 2 | 2 | 5 | 5 | 5 | 3 | 2 | 5 | 5 | 3 | 2 | 1 | 4 | 4 | 3 | 3 | 2 | 1 | 4 | 1 | 2 |
| Sequence 3 | 3 | 2 | 1 | 2 | 5 | 5 | 1 | 3 | 2 | 4 | 5 | 1 | 3 | 2 | 5 | 1 | 2 | 5 | 4 | 1 |
| Sequence 4 | 4 | 1 | 3 | 1 | 4 | 1 | 4 | 4 | 5 | 5 | 4 | 3 | 2 | 4 | 1 | 3 | 3 | 3 | 5 | 3 |
| Sequence 5 | 5 | 4 | 2 | 4 | 2 | 4 | 3 | 2 | 1 | 3 | 2 | 5 | 1 | 5 | 4 | 5 | 5 | 2 | 2 | 5 |

TABLE 11

| | Time period (time slot) | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Sequence 1 | 1 | 1 | 1 | 1 | 1 | 1 | 1 | 1 | 1 | 1 | 1 | 1 | 1 | 1 | 1 | 1 | 1 | 1 | 1 | 1 |
| Sequence 2 | 2 | 2 | 2 | 2 | 2 | 2 | 2 | 2 | 2 | 2 | 2 | 2 | 2 | 2 | 2 | 2 | 2 | 2 | 2 | 2 |
| Sequence 3 | 3 | 3 | 3 | 3 | 3 | 3 | 3 | 3 | 3 | 3 | 3 | 3 | 3 | 3 | 3 | 3 | 3 | 3 | 3 | 3 |
| Sequence 4 | 4 | 4 | 4 | 4 | 4 | 4 | 4 | 4 | 4 | 4 | 4 | 4 | 4 | 4 | 4 | 4 | 4 | 4 | 4 | 4 |
| Sequence 5 | 5 | 5 | 5 | 5 | 5 | 5 | 5 | 5 | 5 | 5 | 5 | 5 | 5 | 5 | 5 | 5 | 5 | 5 | 5 | 5 |

The number of multiple access resources used is 5, and the cross-correlations between multiple access resources are shown in Table 12. In Table 2, resources may mean multiple access resources.

TABLE 12

| | Resource 1 | Resource 2 | Resource 3 | Resource 4 | Resource 5 |
|---|---|---|---|---|---|
| Resource 1 | 0 | 0.676535 | 0.788559 | 0.269420 | 0.361362 |
| Resource 2 | 0.676535 | 0 | 0.229959 | 0.053460 | 0.528950 |
| Resource 3 | 0.788559 | 0.229959 | 0 | 0.245295 | 0.478332 |
| Resource 4 | 0.269420 | 0.053460 | 0.245295 | 0 | 0.235255 |
| Resource 5 | 0.361362 | 0.528950 | 0.478332 | 0.235255 | 0 |

In the case where 5 terminals all transmit data in this environment, Table 13 shows simulation results for the amount of interference per multiple access resource received by each terminal for the respective schemes.

As shown in Table 13, in the case of the multiple access resource allocation scheme according to an embodiment of the present disclosure, all the terminals experience the same

TABLE 13

| | Fixed scheme | Random scheme | Proposed scheme |
|---|---|---|---|
| UE1 | 2.095875 | 1.568687 | 1.546851 |
| UE2 | 1.488904 | 1.556526 | 1.546851 |
| UE3 | 1.742145 | 1.638834 | 1.546851 |
| UE4 | 0.80343 | 1.497878 | 1.546851 |
| UE5 | 1.6039 | 1.472329 | 1.546851 |

Table 14 shows the deviations of MAI in the above-described three schemes when 3 terminals (UE1, UE3, and UE5) of 5 terminals transmit data. As in the case of Table 13, the multiple access resource allocation scheme according to an embodiment of the present disclosure does not differ in the MAIs between terminals. On the other hand, the fixed sequence scheme exhibits a very large MAI variation, and the random sequence scheme has a MAI variation of about 10%.

TABLE 14

| | Fixed scheme | Random scheme | Proposed scheme |
|---|---|---|---|
| UE1 | 2.095875 | 1.568687 | 1.546851 |
| UE2 | 1.488904 | 1.556526 | 1.546851 |
| UE3 | 1.742145 | 1.638834 | 1.546851 |
| UE4 | 0.80343 | 1.497878 | 1.546851 |
| UE5 | 1.6039 | 1.472329 | 1.546851 |

Figure 9:
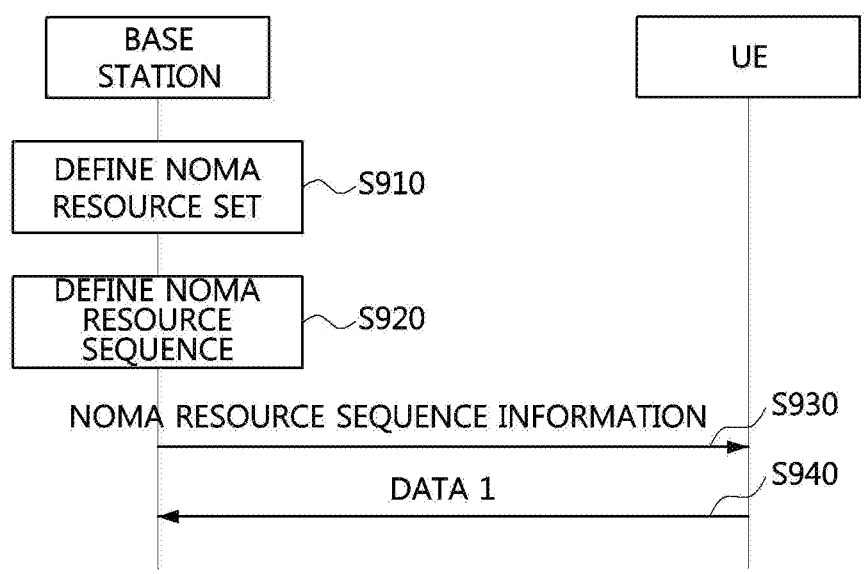
FIG. 9 is a sequence chart illustrating a UL transmission and reception method using a NOMA resource allocation method according to an embodiment of the present disclosure.

FIG. 9 is a sequence chart illustrating a UL transmission and reception method using a NOMA resource allocation method according to an embodiment of the present disclosure.

Referring to FIG. 9, a terminal may receive NOMA resource sequence information per data symbol unit or data symbol group unit from a base station, and transmit data to the base station using the received NOMA resource sequence information. That is, since the embodiment of the present disclosure illustrated in FIG. 9 corresponds to the embodiment in the UL direction that is symmetrical with the embodiment illustrated in FIG. 6, the functions and/or structures in the embodiment of FIG. 6 may also be applied to the embodiment of FIG. 9.

Specifically, a set of NOMA resources that can be used and allocated by the base station supporting the NOMA scheme may be defined (S910).

As described above, spreading codes and frequency resource mapping patterns (subcarrier mapping patterns) may be used as NOMA resources. Here, a set of codebooks and frequency resource mapping patterns, which is a collection of spreading codes and subcarrier mapping patterns used in the communication system, may be referred to as a multiple access resource set.

Then, the base station may define a sequence for supportable NOMA resources (i.e., NOMA resource sequence) (S920). The defined sequence may utilize the sequence in the embodiment of the invention of FIG. 6. Thereafter, the base station may inform the NOMA resource set determined in the previous step and the NOMA resource sequence associated therewith to the terminal (S930). The information on the NOMA resource set and the NOMA resource sequence may be included in system information transmitted to the terminal.

Then, the terminal may transmit data to the base station using the NOMA resource set and the NOMA resource sequence for the corresponding terminal received from the base station (S650). Here, the base station receiving the data transmitted by the terminal using the NOMA resource set and the NOMA resource sequence associated therewith may be the base station having transmitted the information on the NOMA resource set and the NOMA resource sequence or may be another base station. It has been described above that the NOMA resources allocated according to the NOMA resource sequence may be allocated in each transmission symbol and/or each transmission symbol group.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a non-orthogonal multiple access (NOMA) based communication system, the operation method comprising:
  receiving information on a NOMA resource sequence allocated by a base station from the base station; and
  transmitting data symbols or data symbol groups to the base station by using NOMA resources indicated by the information on the NOMA resource sequence, the NOMA resources being differently allocated to each data symbol or each data symbol group according to the NOMA resource sequence,
  wherein the NOMA resource sequence indicates at least one NOMA resource in a NOMA resource set, a plurality of terminals including the terminal are classified into a plurality of groups, non-orthogonal resource allocation is used among the classified groups, and orthogonal resource allocation is used within each of the classified groups, and
  wherein, when a number of data symbols or data symbol groups transmitted by a terminal x and a terminal y using a NOMA resource a and a NOMA resource b is $W_{xy}^{ab}$, the NOMA resources are allocated so as to satisfy $W_{ij}^{pq} = W_{mn}^{rs}$ (for all i≠j, m≠n, p≠q, r≠s).

2. The operation method according to claim 1, wherein the NOMA resource is a spreading code allocated by the base station.

3. The operation method according to claim 2, wherein a degree of cross-correlation between the spreading codes varies every time slot.

4. An operation method of a base station in a non-orthogonal multiple access (NOMA) based communication system, the operation method comprising:
  transmitting information of a NOMA resource sequence allocated to a first terminal to the first terminal; and
  receiving data symbols or data symbol groups from the first terminal by using NOMA resources indicated by the information on the NOMA resource sequence, the NOMA resources being differently allocated to each data symbol or each data symbol group according to the NOMA resource sequence,
  wherein the NOMA resource sequence indicates at least one NOMA resource in a NOMA resource set, a plurality of terminals including the first terminal are classified into a plurality of groups, non-orthogonal resource allocation is used among the classified groups, and orthogonal resource allocation is used within each of the classified groups, and
  wherein, when a number of data symbols or data symbol groups transmitted by a terminal x and a terminal y using a NOMA resource a and a NOMA resource b is $W_{xy}^{ab}$, the NOMA resources are allocated so as to satisfy $W_{ij}^{pq} = W_{mn}^{rs}$ (for all i≠j, m≠n, p≠q, r≠s).

5. The operation method according to claim 4, wherein the NOMA resource is a spreading code allocated to the first terminal.

6. The operation method according to claim 5, wherein a degree of cross-correlation between the spreading codes varies every time slot.

7. The operation method according to claim 4, further comprising:
classifying the at least one terminal into different (S−1) groups each having S orthogonal resources;
allocating orthogonal resources to terminals in each group among the classified groups; and
allocating the NOMA resources among the classified groups.

8. The operation method according to claim 7, wherein the orthogonal resources of each group are identical to or different from each other.

9. The operation method according to claim 7, wherein a t-th value $Z_{gi}^{t}$ of an i-th NOMA resource sequence in a g-th group among the classified groups is defined as $Z_{gi}^{t}=L_g^{i(w+1)}$ for an element $L_k^{pq}$ at a p-th row and a q-th column of a matrix $L_k$ which is a N×N mutually-orthogonal Latin square matrix, and t=N×v+w (v is a non-negative integer, and w is one of $\{0, 1, 2, \ldots, N-1\}$).

10. A terminal in a non-orthogonal multiple access (NOMA) based communication system, the terminal comprising at least one processor, a memory storing at least one instruction executed by the at least one processor, and a transceiver controlled by the at least one processor, wherein the at least one instruction is configured to:
receive, by using the transceiver, information on a NOMA resource sequence allocated by a base station from the base station; and
transmit, by using the transceiver, data symbols or data symbol groups to the base station by using NOMA resources indicated by the information on the NOMA resource sequence, the NOMA resources being differently allocated to each data symbol or each data symbol group according to the NOMA resource sequence,
wherein the NOMA resource sequence indicates at least one NOMA resource in a NOMA resource set, a plurality of terminals including the terminal are classified into a plurality of groups, non-orthogonal resource allocation is used among the classified groups, and orthogonal resource allocation is used within each of the classified groups, and
wherein the NOMA resource sequence uses a mutually-orthogonal Latin square matrix, a t-th value $Z_i^{t}$ of an i-th NOMA resource sequence is defined as $L_{v+1}^{i(w+1)}$ for an element $L_k^{pq}$ at a p-th row and a q-th column of a matrix $L_k$ which is a N×N mutually-orthogonal Latin square matrix, and t=(N−1)×N×u+N×v+w (u and v are non-negative integers, and w is one of $\{0, 1, 2, \ldots, N-1\}$).

11. The terminal according to claim 10, wherein the NOMA resource is a spreading code allocated by the base station.

12. The terminal according to claim 10, wherein the NOMA resource is a subcarrier mapping pattern in a radio resource block (RB), which is used for data communications with the base station.

* * * * *